United States Patent
Ignatz-Hoover

(10) Patent No.: US 8,207,247 B2
(45) Date of Patent: Jun. 26, 2012

(54) PROCESSES FOR PREPARING RUBBER BLEND COMPOSITIONS

(75) Inventor: Frederick Ignatz-Hoover, Elyria, OH (US)

(73) Assignee: Flexsys America L.P., Akron, OH (US)

( * ) Notice: Subject to any disclaimer, the term of this patent is extended or adjusted under 35 U.S.C. 154(b) by 136 days.

(21) Appl. No.: 12/598,158

(22) PCT Filed: May 1, 2008

(86) PCT No.: PCT/US2008/062258
§ 371 (c)(1),
(2), (4) Date: Mar. 23, 2010

(87) PCT Pub. No.: WO2008/137570
PCT Pub. Date: Nov. 13, 2008

(65) Prior Publication Data
US 2010/0184893 A1    Jul. 22, 2010

Related U.S. Application Data

(60) Provisional application No. 60/915,568, filed on May 2, 2007.

(30) Foreign Application Priority Data

May 3, 2007   (EP) ..................................... 07107423

(51) Int. Cl.
*C08J 3/20* (2006.01)
(52) U.S. Cl. ........................................................ 523/351
(58) Field of Classification Search ................... 523/351
See application file for complete search history.

(56) References Cited

U.S. PATENT DOCUMENTS
2002/0014185 A1  2/2002  Lamba et al.
2002/0139461 A1  10/2002 Pyle et al.

FOREIGN PATENT DOCUMENTS
EP   0 051 450 A   5/1982
FR   2 447 946 A   8/1980

*Primary Examiner* — Edward Cain
(74) *Attorney, Agent, or Firm* — Brinks Hofer Gilson & Lione

(57) ABSTRACT

Processes for mixing a filler with a rubber blend containing at least one isoprene elastomer and one butadiene elastomer are provided. Preferably, the processes include the steps of: combining elastomers or a blend of elastomers, a carbon black and/or silica filler(s) and a quinone diimine antidegradant in a rubber composition; mixing the rubber composition for a viscosity-reducing effective period of time to reduce the viscosity of the composition; and discharging the mixed composition. The compositions are preferably discharged from the mixing vessel at or near a minimum viscosity occurring at a temperature of about 120-160° C.

13 Claims, 9 Drawing Sheets

PROCESSES FOR PREPARING RUBBER BLEND COMPOSITIONS

RELATED APPLICATIONS

This application claims priority to International Application No. PCT/US2008/62258, filed May 1, 2008, which application claims the benefit of U.S. Provisional Patent Application Ser. No. 60/915,568, filed May 2, 2007, and European Patent Application EP 07 10 7423, filed May 3, 2007, all of which are incorporated herein by reference in their entirety.

TECHNICAL FIELD

This disclosure describes improved processes for mixing rubber compositions. Preferred processes include the mixing of rubber blends of isoprene and butadiene-containing elastomers with a filler and an antidegradant to form rubber compositions useful for the manufacture of various rubber-containing products.

BACKGROUND

As the demand for rubber products increase, there is a need for improved processes for mixing rubber compounds that provide reduced mixing time and thus improve mixing capacity in a cost-effective manner without compromising the physical properties of the final products. In addition, increasing demands for difficult-to-mix compounds also require processes allowing increased mixing capacity. These difficult-to-mix compounds include rubber blend compositions containing high natural rubber content with polybutadiene or styrene butadiene rubber elastomers and filled with reinforcing small particle carbon black. The finer grade carbon blacks are often very difficult-to-mix. Many products, such as higher mileage truck tires, are made from rubber compounds including finer grade carbon blacks and other difficult-to-mix rubber materials, underlining the importance of improved rubber mixing processes.

Improvements in mixing efficiency can offer significant cost savings in the production of rubber compounds. Mixing fine particle carbon black into various grades of rubber and rubber blends comprising a tougher natural rubber and a softer synthetic diene elastomer can be a difficult and time consuming process. Often, long mixing times or multistage mixes are required to produce compounds which can be handled adequately on down-stream processing equipment. In some cases, pre-mastication of the natural rubber is helpful, but pre-mastication may result in a loss of mixing capacity as time in the mixer is dedicated to pre-mastication and not to productive mixing. In the production environment, the Mooney viscosity of the compound gauges the quality of the mix. Only upon achieving a predetermined Mooney viscosity does further downstream processing continue (e.g., calendaring and extrusion). Often these difficult-to-mix compounds require several passes through a mixer in order to achieve the desired viscosity. While pre-mastication techniques and additions of oils or soaps may reduce compound viscosities, physical and dynamic mechanical properties may suffer when theses additives are included.

Techniques to reduce the viscosity of a natural rubber blend compound include masticative reduction of molecular weight, chemical peptization (chemical-oxidative molecular weight reduction), addition of diluents and lubricants (soaps and oils) and lowering the filler loading in the rubber blend compound. However, each of these techniques has limitations or some potential disadvantage. Mastication and chemical peptizing result in a disadvantage of increased mixing time. Processing aids and peptizers result in compounds with lower Mooney viscosity and processing improvements, but the final vulcanizates often suffer from reduced modulus and increased heat buildup, reducing the compound performance in dynamic applications. Other processing aides such as soaps and oils may provide some lubricity and softening activity. Peptizers enhance the oxidative degradation of natural rubber during the mixing process. Chemical peptizing at high temperatures leads to increased amounts of low molecular weight polymer due to the random nature of the oxidative scission process. The low molecular weight polymer adversely affects dynamic mechanical properties. Likewise the use of diluents, adding soaps and oils, also reduce the viscosities, but may result in the deterioration of dynamic mechanical properties in proportion to the levels of diluents used. Compound modification by lowering the filler loading can only be used when the demands of the formulation have sufficient tolerance to afford such changes.

Antidegradants are preferably quinones, quinone diimines or quinone imines, such as N-(1,3-dimethylbutyl)-N'-phenyl-p-quinonediimine, may protect natural rubber from oxidative degradation during the mixing process. These antidegradants, particularly quinone diimines (QDI), are multi-functional chemicals which function primarily as a long-lasting antidegradant. QDI enhances mixing and provides viscosity reductions in natural rubber compounds with little or no loss in vulcanizate performance by protecting the polymer from excessive molecular weight reduction during mixing while providing both bound antioxidant and diffusible antiozonant activity in the final vulcanizate. QDI is extremely efficient at capturing chains broken during the shearing action of the mixing process. Published patent application WO 99/20687, filed 19 Oct. 1998 by Ignatz-Hoover, describes the high temperature mixing of elastomeric rubber materials with QDI and carbon black prior to vulcanization and published patent application WO 01/92423, filed 22 May 2001 by Lamba et al. describes compositions containing carbon black and a QDI compound. Accordingly, a quinone diimine antidegradant typically reacts faster than conventional antidegradants to stabilize broken chains in natural rubber and minimize the oxidative chain degradation that occur during mixing of natural rubber compounds in intensive mixing equipment. The quinone diimine is believed to react by adding to the radical chain end of natural rubber during mixing. This reaction not only produces a polymer-bound PPD moiety, but prevents the recombination of the broken chains. These two benefits accelerate viscosity reduction and improve polymer-to-filler interaction during mixing of natural rubber compositions that do not include synthetic non-isoprene rubber elastomers.

While it is known that free radical chemistry is the origin of molecular weight reduction reactions in natural rubber compounds, it is also known that gel formation in butadiene-based synthetic rubber elastomers results from radicals formed during mixing. In the butadiene-based elastomers, radicals are believed to react to increase molecular weight thereby increasing viscosity, or upon further reaction, forming phases of crosslinked rubber either free or in association with carbon black (i.e. bound rubber formation). Therefore, what is needed are improved methods for mixing rubber blends containing natural rubber and butadiene-containing rubber elastomers, such as styrene-butadiene copolymers or styrene-butadiene-isoprene copolymers, with a desired reduction in viscosity and a desirably low discharge temperature, thereby providing reduced mixing times and increased mixing capacities.

SUMMARY

The present disclosure relates to methods for producing rubber blend compounds containing an antidegradant and a blend of both natural rubber elastomer and other elastomers (such as butadiene-containing rubber elastomers). By mixing an antidegradant such as quinone diimine with a rubber blend composition comprising an isoprene elastomer and a butadiene elastomer in an unvulcanized master batch composition, a minimum master batch viscosity may be achieved at an unexpectedly low temperature, permitting desirably reduced mixing times and lower discharge temperatures. Typically, the viscosity of a rubber master batch composition steadily decreases during mixing, leading to a reduction of viscosity as a function of temperature until a minimum viscosity is achieved at the discharge temperature and increased mixing of the rubber master batch does not usually increase the viscosity once the minimum viscosity is achieved. However, continued mixing of an unvulcanized rubber blend master batch composition containing certain antidegradants, such as a quinone diimine, and a blend of natural rubber and butadiene-containing rubber elastomers after achieving the minimum viscosity may unexpectedly increase the viscosity of the master batch composition. The minimum viscosity of such a rubber blend master batch composition with quinone diimine may achieve a minimum viscosity at a lower temperature than a comparable rubber blend composition without the quinone diimine, or even a comparable rubber blend composition with the quinone diimine but containing less butadiene elastomer. Preferred embodiments include methods of rubber mixing and compounding that permit identification of a discharge temperature corresponding to the minimum viscosity of an unvulcanized rubber composition including a blend of an isoprene elastomer and a butadiene containing elastomer in combination with a filler and an antidegradant selected from the group consisting of: a quinone, a quinoneimine and/or a quinone diimine. The minimum viscosity of such a rubber composition may occur at a lower discharge temperature than if the antidegradant or the butadiene elastomer were either not included or if the amounts of either of these components were reduced. Surprisingly, continuing to mix such a rubber blend composition (i.e., a natural rubber/synthetic rubber blend with a quinone, a quinoneimine and/or a quinone diimine) after achieving the minimum viscosity may actually result in an undesirable increase in the viscosity and/or unnecessary increases in mixing time.

Preferably, an antidegradant is added to rubber compounds with desired levels of both diene based polymers and natural rubber polymers to balance radical molecular weight reduction chemistry in natural rubber with molecular weight increasing chemistry in the diene based elastomer phase. In particular, preferred embodiments provide processes for mixing a rubber blend composition containing an isoprene elastomer and a butadiene-containing elastomer with a filler and an antidegradant. The filler is preferably a carbon black (CB), a silica or a mixture thereof; the antidegradant is preferably a quinone, a quinoneimine, a quinone diimine (QDI) or a mixture thereof. For example, the rubber blend may be a blend of a natural rubber elastomer (NR) and a butadiene rubber elastomer (BR) and/or a styrene-butadiene rubber elastomer (SBR). In particular, the rubber blend composition can be an unvulcanized master batch composition containing 100 parts per hundred weight rubber (phr) of total rubber (e.g., neat polymers comprising an isoprene and a butadiene elastomer), about 0.1-10.0 phr of the quinone diimine antidegradant and about 1-80 phr filler. The types of rubber may be chosen from several different elastomers which may include at least one isoprene based elastomer and one butadiene based elastomer and may be chosen in any suitable amount of the different elastomers, but typically contains about 10-95% wt natural rubber (including, for example, about 40-95% wt, 40-80% wt, 40-55% wt, 50-55% wt, 50-80% wt, or about 50-95% wt) with the remaining rubber blend comprising at least one synthetic rubber elastomer, such as BR or SBR.

The antidegradant may be a quinone, a quinoneimine or a quinone diimine. Preferably, the antidegradant is a quinone diimine according to Formula (Ia) or Formula (Ib):

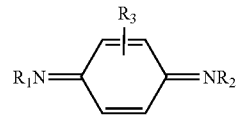
(Ia)

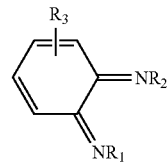
(Ib)

wherein $R_1$, $R_2$ and $R_3$ are the same or different and are independently selected from the group consisting of: hydrogen, hydroxyl, halogen, alkyl, alkoxy, aryl, arylakyl, alkaryl, cycloalkyl, heterocycle, acyl, aroyl, carbamyl alcohols, thiols, alkylthiols, and cyano moieties. More preferably, $R_1$ is hydrogen and $R_2$ and $R_3$ are independently groups comprising alkyl and/or aryl moieties. For example, $R_1$ may be hydrogen and $R_2$ and $R_3$ may be independently an alkyl or aryl group. Most preferably, the antidegradant is the antidegradant compound is N-phenyl-N'-1,3-dimethylbutyl-p-quinone diimine.

Preferably, the mixing process includes the steps of: (a) combining the elastomers of the elastomer blend, the filler and the antidegradant in a mixing vessel to form an unvulcanized master batch rubber blend composition; (b) mixing the master batch rubber blend composition for a viscosity-reducing effective period of time to reduce the viscosity of the composition to a minimum viscosity, preferably without increasing the viscosity above the minimum viscosity; and (c) discharging the master batch composition from the mixing vessel at or near the minimum viscosity. The elastomer blend may be combined with the filler and the antidegradant prior to mixing the unvulcanized rubber composition. Optionally, the filler and the antidegradant may be pre-mixed to form a treated filler, such as a treated carbon black, prior to combining the treated carbon black with the elastomer blend. The viscosity-reducing effective period of time is the time required to mix the master batch composition to a minimum viscosity of the master batch rubber blend composition. This may occur at a temperature that is less than that of the minimum viscosity of a comparable unvulcanized rubber master batch composition without the antidegradant or the synthetic elastomer. Typically, the minimum viscosity of natural or rubber blend composition containing QDI occurs between the temperatures of about 100-180° C., lower than the temperature of the minimum viscosity of a comparable blend without QDI. The minimum viscosity of a rubber blend composition with QDI may occur at a lower temperature than that of a comparable natural rubber composition. Unexpectedly, increasing the temperature of a rubber blend composition with QDI after achieving the minimum viscosity may increase the viscosity. The minimum viscosity attained by preferred master batch rubber blend compositions comprising QDI, a filler, a natural rubber elastomer and a synthetic rubber elastomer (e.g., NR/SBR or NR/BR rubber blends) may occur during mixing at a temperature of about 120-160° C., preferably between about 140 and 160° C. Increasing the temperature of these rubber blend compositions above about 160° C. may raise the viscosity of these compositions above the minimum viscosity. Preferably, the mixing is performed for a time required to mix the master batch composition to a minimum viscosity occurring between 120-160° C., 130-160° C. or 140-160° C.

Significantly, by reducing the discharge temperature for achieving the minimum viscosity of a rubber blend composition with QDI and a suitable filler, the total mixing time of the master batch may be desirably reduced. The total mixing time is preferably less than 450 seconds, and most preferably about 300 seconds or less. Typically, the master batch has a viscosity of not more than about 80 Mooney Viscosity ML(1+4) Units in a large rotor mixing vessel or not more than about 45 Mooney Viscosity MS (1+4) Units in a small rotor mixing vessel. Other compounding ingredients such as zinc oxide, stearic acid, as small amounts of process oil may be added in the formation of the rubber master batch. The discharged master batch composition may also be allowed to cool after discharging from the mixer and reintroduced into the mixer for further mixing to prepare softer, less viscous master batch composition as may be desired or required for further handling and shaping of the master batch composition.

In a first embodiment, a mixing process includes the step of combining the various rubbers of the blend composition with the filler and the antidegradant without a pre-mastication step and/or without a subsequent remill or remixing stage. In one aspect, the reduced mixing times and increased mixing capacities provided by the methods and compositions described herein permit mixing of rubber blend compositions in the absence of at least one of an initial pre-mastication step and a remill or remixing step later in the mixing process. A pre-mastication step may include the mixing of the elastomer blend composition prior to adding the quinone diimine and or the filler and other compound ingredients. The filler is preferably a carbon black, a silica or a mixture thereof. Preferably, the QDI antidegradant is added to the elastomer blend with the carbon black. In a second embodiment, a mixing process includes the step of discharging the master batch at a temperature below about 160° C., such as a temperature of between about 100-160° C., and more preferably below about 150° C., and most preferably below about 140° C. In a third embodiment, a mixing process is performed with a master batch rubber blend composition that is free of, or at least substantially free of, a peptizer. Preferably, a mixing process includes two or more aspects described with respect to the first, second and third embodiments.

Optionally, the process may further include the step of (d) combining the discharged master batch composition with at least one sulfur-containing vulcanizing agents and vulcanization accelerators and vulcanizing the resulting composition to form the vulcanized rubber composition. The vulcanized rubber compositions may be used, for example, to form hoses, belts, vibration isolators, bushings, treads, other tire parts such as tread base, wire coat compound, abrasion strips, chafer strips, wedges, shoulders, sidewalls, carcasses, bead compounds, tires or other rubber article.

Other embodiments encompass details about reaction mixtures, ratios of ingredients, and particular reaction conditions, all of which are hereinafter disclosed in the following discussion of certain preferred embodiments.

DETAILED DESCRIPTION

Figure 1:
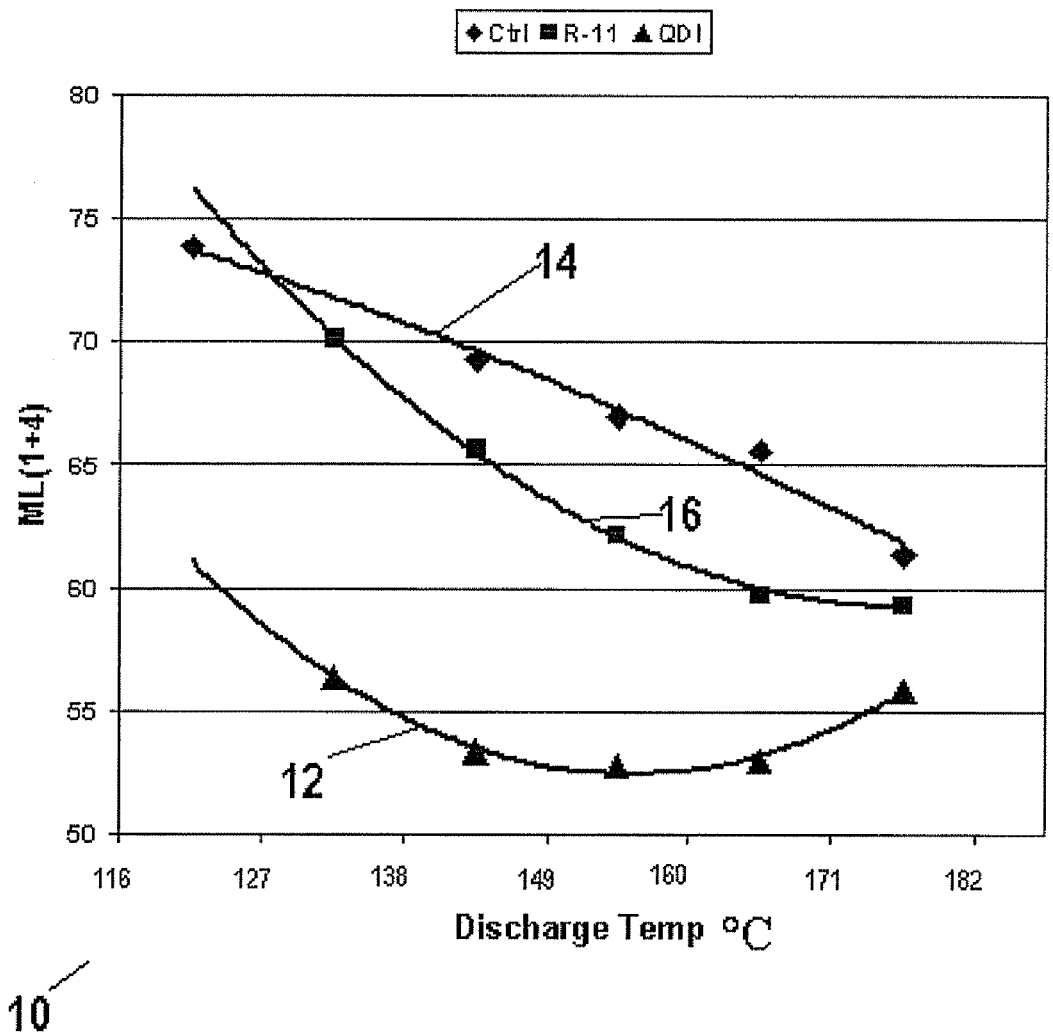
FIG. 1 is a graph showing the reduction in Mooney Viscosity as a function of the discharge temperature for a rubber blend comprising natural rubber (45%) and butadiene rubber (55%).

The present disclosure describes improved methods for mixing rubber blend compositions comprising an isoprene elastomer and a butadiene-containing elastomer with desirably reduced mixing times, permitting increases in mixing capacities. In particular, preferred mixing methods include combining the rubber blend composition with a quinone diimine antidegradant and a carbon black, mixing the combined composition for a period of time effective to reduce the viscosity of the combined composition and discharging the viscosity-reduced combined composition at a desirably low temperature. The combined composition is preferably free of a peptizer, and the discharge temperature is desirably lower than the effective temperature range of a peptizer. The preferred embodiments provide reduction in mixing times and increased mixing capacities by increasing the rate of viscosity reduction in the combined composition during mixing and lowering the discharge temperature. Notably, certain preferred combined compositions have a minimum viscosity at temperatures between about 120 and 160° C., permitting discharge temperatures below about 160° C. after reduced mixing times compared to combined mixtures without the quinone diimine antidegradant. Significantly, the improved mixing methods and rubber blend compositions disclosed herein can provide reductions in the mixing time of up to about 33% compared to compositions without QDI, leading to increased mixing capacity and/or cost savings. Certain preferred processes for mixing of rubber blend compositions are described in detail below to illustrate preferred embodiments of the invention, which also includes combinations and variations of the illustrated embodiments and equivalents thereof. The preferred embodiments relate to processes for mixing rubber blend compositions.

Unless otherwise indicated, the following terms shall be defined herein as indicated below.

The term "viscosity" of a rubber composition herein, unless otherwise indicated, shall refer to Mooney Viscosity, defining the standard measure of the viscosity of the rubber. A Mooney viscometer is used to measure the Mooney viscosity. Units of measurement are in Mooney units.

The term "rubber blend" refers to two or more elastomers in the neat form used to prepare a blend or a mixture of two or more different neat elastomers, such as a blend of two or more natural (e.g., isoprene) and/or synthetic (e.g., butadiene and/or styrene) rubber materials.

The term "rubber composition," unless otherwise indicated, refers to compositions containing at least one rubber elastomer and/or rubber blend(s) and which optionally further include other ingredients such as fillers, softeners, activators, vulcanizing agents and/or accelerators.

Unless otherwise indicated, the term "isoprene elastomer" refers to an elastomer comprising isoprene polymer units and having a viscosity during mixing that decreases between mixing temperatures of about 120° C. and 180° C. The viscosity of an isoprene elastomer typically steadily decreases with increasing mixing temperature between about 120° C. and 180° C., without an increase in viscosity with increasing mixing in this temperature range. Isoprene elastomers are preferably obtained from natural rubber, although they may be produced as a synthetic natural rubber. Preferred isoprene elastomers have high molecular weights of about $1 \times 10^5$ or higher. The isoprene elastomer is preferably substantially free of butadiene and styrene polymer units, and desirably consists essentially of isoprene polymer units. The isoprene elastomer may optionally include non-isoprene polymer units that do not result in an increase in the viscosity with increased mixing temperature between about 120° C. and 180° C. For example, the isoprene elastomer preferably includes at least about 90% isoprene polymer units, and preferably at least 92%, 95%, 97%, 98%, 99% or 100% isoprene polymer units, optionally including copolymers with other polymer units.

The term "non-isoprene elastomer" refers to an elastomer that is substantially free of isoprene elastomer polymer units, such that the viscosity of the elastomer is controlled by non-isoprene polymer units during mixing. Examples of non-isoprene elastomers include a butadiene elastomer, certain butadiene-containing elastomers, and a copolymer of butadiene and styrene.

Unless otherwise indicated, the term "butadiene-containing elastomer" refers to an elastomer comprising butadiene polymer units. The butadiene-containing elastomer may include polymer units of isoprene, styrene and/or other polymer units. The composition of the butadiene-containing elastomer is preferably selected such that mixing of the butadiene-containing elastomer with QDI at typical mixing temperatures and conditions increases the molecular weight of the butadiene-containing elastomer. Examples of butadiene-containing elastomers include butadiene, butadiene-styrene copolymers, butadiene-isoprene copolymers, and butadiene-styrene-isoprene copolymers (e.g., a copolymer with about 20-35% butadiene polymer units, about 20-35% isoprene polymer units with the remaining polymer formed from styrene polymer units).

The term "relaxation rate" refers to a measurement of the slope and intercept of the regression line in a Mooney stress relaxation experiment. In this determination, the rotor of the Mooney viscometer is stopped and the decay of torque is measured. Decay data regression analysis, performed to fit a log-log data, provides the slope and intercept. The slope is a direct measure of the relaxation rate wherein the greater the slope (in absolute value) the faster the relaxation rate.

The term "uncured tangent delta" (or tan delta @ mL) refers to the measure of energy loss at minimum torque in a rheometer. The higher the uncured tangent delta, the better the processability of the rubber (i.e. softer, less viscous, lower die swell).

The term "cured tangent delta" (tan delta @ mh) refers to the measure of energy loss at maximum torque in a rheometer. Cured tangent delta often reflects the expected performance of rubber in terms of energy dissipation. Low numbers represent compounds with low energy losses thereby imparting lower rolling resistance (i.e. desirable in a tire for efficient fuel consumption).

The "Payne effect" is a measure of the filler networking phenomenon. Compounds having high Payne effect values tend to be less "energy efficient" than compounds with lower Payne effect values.

The abbreviation "phr" means the number of parts by weight per 100 parts by weight of rubber. For example, in the case of a rubber blend, it would be based on 100 parts by weight of total rubber. "PhCB" means the number of parts by weight per 100 parts by weight of carbon black.

The rubber blend compositions preferably include at least one isoprene elastomer blended with at least one butadiene-containing elastomer. The isoprene elastomer is preferably a natural rubber. The butadiene-containing polymer is preferably a synthetic rubber such as butadiene rubber (BR), styrene-butadiene rubber (SBR) or mixtures or co-polymers of BR and SBR. The butadiene-containing polymer may be a copolymer containing isoprene units. One suitable butadiene-containing rubber is a styrene-isoprene-butadiene rubber (SIBR). Preferably, the rubber blend composition includes at least 5 wt % of the synthetic elastomer combined with natural rubber, and more preferably at least 10 wt % synthetic rubber. Examples of preferred rubber blend compositions include weight ratios of synthetic to natural rubber of between about 5:95 and 80:20, including weight ratios of 10:90, 15:85, 20:80, 25:75, 30:70, 35:65, 40:60, 45:55, 50:50, 55:45, 60:40, 65:35, 70:30 and 75:25. The weight ratio of the synthetic to the natural rubber may be selected to provide a desired minimum viscosity temperature for a given amount of QDI in the master batch composition.

Examples of suitable synthetic elastomer polymers that may be incorporated in the rubber blend include the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. The rubber blend composition may also include at least one neat rubbers selected from the group consisting of: neoprene (polychloroprene), polybutadiene (including cis-1,4- polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used in the rubber blend include alkoxy-silyl end functionalized solution polymerized polymers (SBR, PBR, IBR and SIBR), silicon-coupled and tin-coupled star-branched polymers. The preferred rubber blends include a natural rubber elastomer and a synthetic rubber elastomer including at least one compounds selected from the group consisting of: polyisoprene, polybutadiene and SBR.

Unless otherwise indicated, the rubber blend is present at 100 parts per hundred rubber (phr), as all other material are added based on 100 parts of rubber material. Batches can be conveniently scaled for different sizes of mixtures using this measurement system.

Preferred master batch compositions include at least one antidegradant compounds in a rubber blend composition. The antidegradant compound(s) preferably includes a quinone, a quinone imine, a quinone diimine (QDI), or any combination thereof having antidegradant properties. At least one antidegradant compounds may be mixed with the rubber blend prior to and/or in conjunction with the carbon black addition.

Preferably, the antidegradant includes a quinone diimine antidegradant (QDI). The QDI antidegradant may include at least one QDI antidegradant compounds. The QDI antidegradant preferably includes at least one quinone diimine compounds according to formulas (Ia) and (Ib):

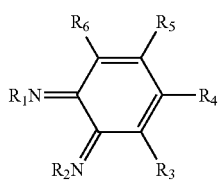

(Ia)

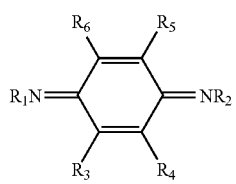

(Ib)

wherein $R_1$ and $R_2$ are independently selected from hydrogen, hydroxyl, alkyl, alkoxy, aryloxy, alkenyl, cycloalkyl, aryl, aralkyl, alkaryl, alkylamino, arylamino, heterocycle, acyl, formyl, aroyl, cyano, halogen, thiol, alkylthio, arylthio, amino, nitro, sulfonate, alkyl sulfonyl, aryl sulfonyl, amino sulfonyl, hydroxy carbonyl, alkyloxycarbonyl and aryloxycarbonyl, wherein the alkyl moieties in the $R_1$ and $R_2$ groups may be linear or branched and each of the $R_1$ and $R_2$ groups may be further substituted; and wherein $R_3$, $R_4$, $R_5$, and $R_6$ are the same or different and are selected from hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, alkylthio, arylthio, amino, nitro, sulfonate, alkyl sulfonyl, aryl sulfonyl, aminosulfonyl, hydroxycarbonyl, alkyloxycarbonyl and aryloxycarbonyl, wherein the alkyl moieties in the $R_3$, $R_4$, $R_5$, and $R_6$ groups may be linear or branched and each of the $R_3$, $R_4$, $R_5$, and $R_6$ groups may be optionally further substituted. It is preferred that $R_1$ and $R_2$ are independently selected from alkyl, alkenyl, cycloalkyl, aryl, aralkyl and alkaryl for quinonediimines. It is also preferred that the number of carbon atoms in any and all of the above R groups be from 0 to about 25. In one embodiment, $R_1$, $R_2$ and $R_3$ are the same or different and are independently selected from the group consisting of: hydrogen, alkyl, aryl, aralkyl, hydroxyl, halogen, alkoxy, alkaryl, cycloalkyl, heterocycle, acyl, aroyl, carbamyl alcohols, thiols, alkylthiols, and cyano.

More preferably, the QDI antidegradant is a quinone diimine according to Formula (IIa) or Formula (IIb):

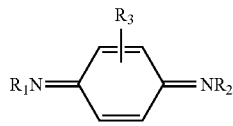

(IIa)

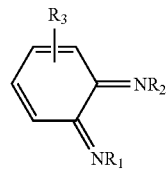

(IIb)

wherein $R_1$, $R_2$ and $R_3$ are the same or different and are independently selected from the group consisting of: hydrogen, hydroxyl, halogen, alkyl, alkoxy, aryl, aralkyl, alkaryl, cycloalkyl, heterocycle, acyl, aroyl, carbamyl alcohols, thiols, alkylthiols, and cyano moieties. More preferably, $R_1$ is hydrogen and $R_2$ and $R_3$ are independently groups comprising alkyl and/or aryl moieties. For example, $R_1$ may be hydrogen and $R_2$ and $R_3$ may be independently groups comprising an alkyl or aryl group (optionally substituted). Most preferably, the antidegradant is the antidegradant compound is N-phenyl-N'-1,3-dimethylbutyl-p-quinone diimine.

The antidegradant may include at least one quinones, such as compounds according to formulas (IIIa) and (IIIb):

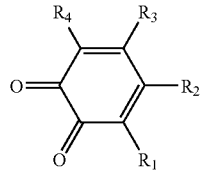

(IIIa)

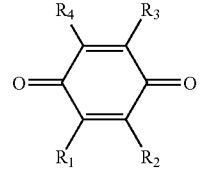

(IIIb)

wherein $R_1$, $R_2$, $R_3$, and $R_4$ are the same or different and are selected from hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, thioalkyl, thioaryl, amino, nitro, sulfonate, sulfone, sulfonamide, carboxylic acid, alkyl ester and, aryl ester, and the alkyl moieties in the $R_1$, $R_2$, $R_3$, and $R_4$ groups may be linear or branched and each of the $R_1$, $R_2$, $R_3$, and $R_4$ groups may be further substituted where appropriate.

The antidegradant may include at least one quinoneimines, such as compounds according to formulas (IVa) and (IVb):

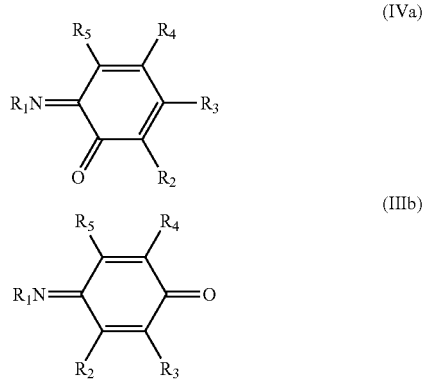

wherein $R_1$ is selected from hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, thioalkyl, thioaryl, amino, nitro, sulfonate, sulfone, sulfonamide, carboxylic acid, alkyl ester and, aryl ester, wherein the alkyl moieties in the $R_1$ groups may be linear or branched and each of the $R_1$ groups may be further substituted where appropriate; further wherein $R_2$, $R_3$, $R_4$, and $R_5$ are the same or different and are selected from hydrogen, hydroxyl, alkyl, alkoxy, aryloxy, alkenyl, cycloalkyl, aryl, aralkyl, alkaryl, alkylamino, arylamino, heterocycle, acyl, aroyl, cyano, halogen, thiol, thioalkyl, thioaryl, amino, nitro, sulfonate, sulfone, sulfonamide, carboxylic acid, alkyl ester and, aryl ester, wherein the alkyl moieties in the $R_2$, $R_3$, $R_4$, and $R_5$ groups may be linear or branched and each of the $R_2$, $R_3$, $R_4$, and $R_5$ groups may be further substituted where appropriate.

The antidegradant may be provided as a QDI, such as the products sold under the tradenames Q-FLEX® QDI (a composition of about 95-98% N-(1,3-dimethylbutyl)-N'-phenyl-p-quinonediimine CAS#52870-46-9, about 1-5% N-(1,3-dimethylbutyl)-N'-phenyl-p-phenylenediamine CAS#793-24-8, about 0-1.5% heptane CAS#142-82-5 and about 0-0.5% 4-methylpentan-2-one CAS#108-10-1), or Q-Black® 50 (a composition of about 50% carbon black CAS#1333-86-4, about 48-49% N-(1,3-dimethylbutyl)-N'-phenyl-p-quinonediimine CAS#52870-46-9 and about 1-2% N-(1,3-dimethylbutyl)-N'-phenyl-p-phenylenediamine CAS#793-24-8), all sold by Flexsys America (Akron, Ohio).

The amount of antidegradant, carbon black and rubber elastomers (including the amounts of butadiene-containing and an isoprene rubber elastomers) mixed can be selected to desirably increase the average molecular weight of the butadiene-containing rubber, promote bound rubber formation during mixing and/or promote cross linking within the mixed rubber composition, particularly at higher mixing temperatures (leading to desirably properties in the final rubber article), while also providing desirably low mixing viscosities. The antidegradant comprising quinones, quinone imines and/or quinone diimines is preferably included in the master batch composition in an amount of about 0.10 to about 10.0 phr, more preferably from about 0.5 to about 4 phr and most preferably about 2 phr, including amounts of 0.5, 1.0, 1.5, 2.0, 2.5, 3.0, 3.5 and 4.0 phr. The actual amount of antidegradant added to a blend composition may be selected to provide a rubber composition with desired properties. The antidegradant is believed to capture free radicals during the mixing process for both natural and synthetic rubber elastomers. In rubber blend compositions with butadiene-containing rubber elastomers, the antidegradant is preferably provided in an amount that permits a desirably low mixing viscosity while also providing a mixed rubber composition that can be formed into rubber articles having desirable properties.

Master batch compositions further include a filler, such as a carbon black (CB) and/or a silica, in addition to the rubber blend composition and the quinone diimine antidegradant (QDI). While certain preferred embodiments are described with respect to a carbon black filler, other filler compositions may also be used, including silica and/or a mixture of silica and carbon black. Carbon black may be added to the master batch in a single step or may be added at ½ the amount to be used, mixed for a suitable period of time (e.g., up to about two minutes) followed by addition of the second-half of the carbon black. Typically, carbon black is included in the master batch composition at about 5-80 phr. Typically, the carbon black is included in the master batch in an amount of at least about 10 phr in the presence of a QDI before the mixing of the master batch. Desirably, the amount of carbon black in the master batch is maximized for a given process. Preferred master batch compositions include 10, 20, 30, 40, 50, 60, 70 or 80 phr carbon black upon discharge of the master batch. Representative examples of carbon blacks include N110, N121, N134, N220, N231, N234, N242, N293, N299, N315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg. Carbon black suitable for use in the invention has a preferred surface area of from about 9 to about 420 $m^2$/g, most preferably about 40 to about 140 $m^2$/g, as measured by the nitrogen adsorption method (ASTM D 4820). The carbon black may be agglomerated in the form of beads or powder. The carbon black types have a preferred particle size of from about 8 to about 300 nm average particle size and most preferably from about 12 to about 100 nm.

A filler may include any silica filler suitable for mixing with rubber for forming rubber compositions useful in making tire compositions, as described in U.S. Pat. No. 5,227,425 to Rauline (filed Feb. 20, 1992) and elsewhere. Both silica obtained by a dry process and silica obtained by a wet process (hydrated silicate) may be employed. The silica used may be any reinforcing silica known to the person skilled in the art, in particular any precipitated or pyrogenic silica. The silica filler preferably has a BET specific surface area of 70-300 $m^2$/g for the purposes of improving fuel efficiency and abrasion resistance of a tire tread rubber composition. Silica may be used together with carbon black or may be used alone. The silica-elastomer interaction can optionally be improved by chemically bonding the two with a chemical coupling agent, such as bis(3-triethoxysilylpropyl)tetra-sulfane, commercially available as Si-69 from Degussa AG, Germany. Coupling agents such as Si-69 create a chemical linkage between the elastomer and the silica, thereby coupling the silica to the elastomer. The filler may also be a mixture of silica and carbon black, for example as described in U.S. Pat. No. 7,199,176 to Mahmud et al., filed Jul. 10, 2002.

For example, the rubber blend composition can be an unvulcanized master batch composition containing 100 parts per hundred weight rubber (phr) of the rubber blend, about 0.1-10.0 phr of the quinone diimine antidegradant and about 1-80 phr carbon black. The rubber blend may include any suitable amount of different elastomers, but typically contains about 40-60% natural isoprene rubber, with the remaining rubber blend comprising at least one synthetic butadiene-containing rubber elastomer, such as BR or SBR. In addition to adding carbon black, the master batch may optionally further include other rubber additives, such as various activators, can be added. Typically, zinc oxide (an activator) is added at about 0.2 to about 10 phr along with the initial carbon black addition. Other rubber processing agents, such as stearic acid, softening agents, tackifiers, resins and other ingredients are added after the initial carbon black addition or along with the second half of the carbon black, depending on the carbon black incorporation method.

Preferably, the mixing process includes the steps of: (a) combining the elastomer blend, the carbon black and the quinone diimine antidegradant in a mixing vessel to form an unvulcanized master batch rubber blend composition; (b) mixing the master batch rubber blend composition for a viscosity-reducing effective period of time to reduce the viscosity of the composition; and (c) discharging the master batch composition from the mixing vessel.

Preferred rubber mixing processes may be performed by mixing the rubber blend composition, the quinone diimine antidegradant and the carbon black in a mixing vessel, such as a conventional Banburry mixer. The mixing speed is about 10-180 rpm, preferably about 60-120 rpm.

In a first embodiment, a mixing process includes the step of combining the rubber blend composition with the carbon black and the quinone diimine antidegradant without a pre-mastication step. A pre-mastication step may include the mixing of the elastomer blend composition prior to adding the quinone diimine or the carbon black. Preferably, the QDI antidegradant is added to the elastomer blend with the carbon black and the mixing is initiated after combining the rubber blend, quinone diimine antidegradant and carbon black in the vessel. In one aspect, rubber blend compositions are mixed in the absence of an initial pre-mastication step. In another aspect, rubber blend compositions are mixed with a pre-mastication step, but without a remill or remixing step later in the mixing process.

The elastomer blend may be combined with the carbon black and the quinone diimine antidegradant prior to mixing the unvulcanized rubber composition. The carbon black and the quinone diimine antidegradant may be pre-mixed to form a treated carbon black prior to combining the treated carbon black with the elastomer blend. Optionally, the quinone diimine antidegradant may be combined with the carbon black to form a treated carbon black. For example, published U.S. patent application US2002/0014185 A1, filed May 21, 2001 by Lamba et al. and incorporated herein by reference in its entirety, describes the preparation of a treated carbon black compound that may be added to the rubber blend as a source of the quinone diimine antidegradant and carbon black. The surface of the carbon black may be optionally treated with from about 0.01 to about 150.0 parts by weight, most preferably from about 0.5 to about 8.0 parts by weight, of the quinone diimine antidegradant per 100 parts by weight of carbon black.

FIG. 1 is a graph 10 showing the reduction in Mooney Viscosity for three different master batch compositions as a function of the discharge temperature during a fourth pass mixing step, immediately prior to discharge from the mixing vessel. The Mooney Viscosity is provided in viscosity units of ML(1+4). The graph 10 includes a first graph 12 obtained from a preferred first master batch composition prepared according to Example 1. The line graphs 12, 14 and 16 discussed below were obtained from compositions according to the correspondingly numbered formulations 12, 14 and 16 in Table 1 of Example 1. The first master batch composition comprises a rubber elastomer blend with natural rubber (45%) and butadiene rubber (55%), 2.0 phr N-phenyl-N'-1,3-dimethylbutyl-p-quinone diimine and 50 phr carbon black. Graph 10 also includes a second graph 14 obtained from a first comparative master batch composition (control) containing the same composition as the first master batch composition without a quinone diimine antidegradant, and a third graph 16 obtained from a second comparative master batch that contains an activated bis-benzamido-diphenyl disulfide peptizer instead of the quinone diimine antidegradant. The viscosity of the first master batch composition graph 12 remains lower than the viscosities obtained from the first and second comparative master batch compositions throughout the range of discharge temperatures tested (from about 115-180° C.). Notably, the viscosity of the first master batch composition graph 12 declines to a minimum viscosity between about 148 and 160° C., and then increases at higher temperatures (e.g., up to about 177° C.). The minimum viscosity between 120-180° C. for the first master batch composition occurs at a temperature less than about 160° C. In contrast, the viscosities of the first comparative master batch composition graph 14 and the second comparative master batch composition 16 continue to decrease with increasing temperature over the full range of discharge temperatures tested. The viscosity minimum for the first comparative master batch composition 14 and the second master batch composition graph 16 occur at the highest temperature measured (about 177° C.). Preferably, the first master batch composition is discharged at or near the minimum viscosity, such as at a temperature of about 140-155° C. or 120-160° C. Comparing the viscosity reduction of the first master batch composition graph 12 with the first comparative master batch composition graph 14 also shows that adding the QDI antidegradant leads to an increase in viscosity with increasing temperatures above about 160° C. for the first master batch composition graph 12 (with QDI), but a decrease in viscosity with increasing temperature above 160° C. for the first comparative master batch composition graph 14 (without QDI).

Figure 2:
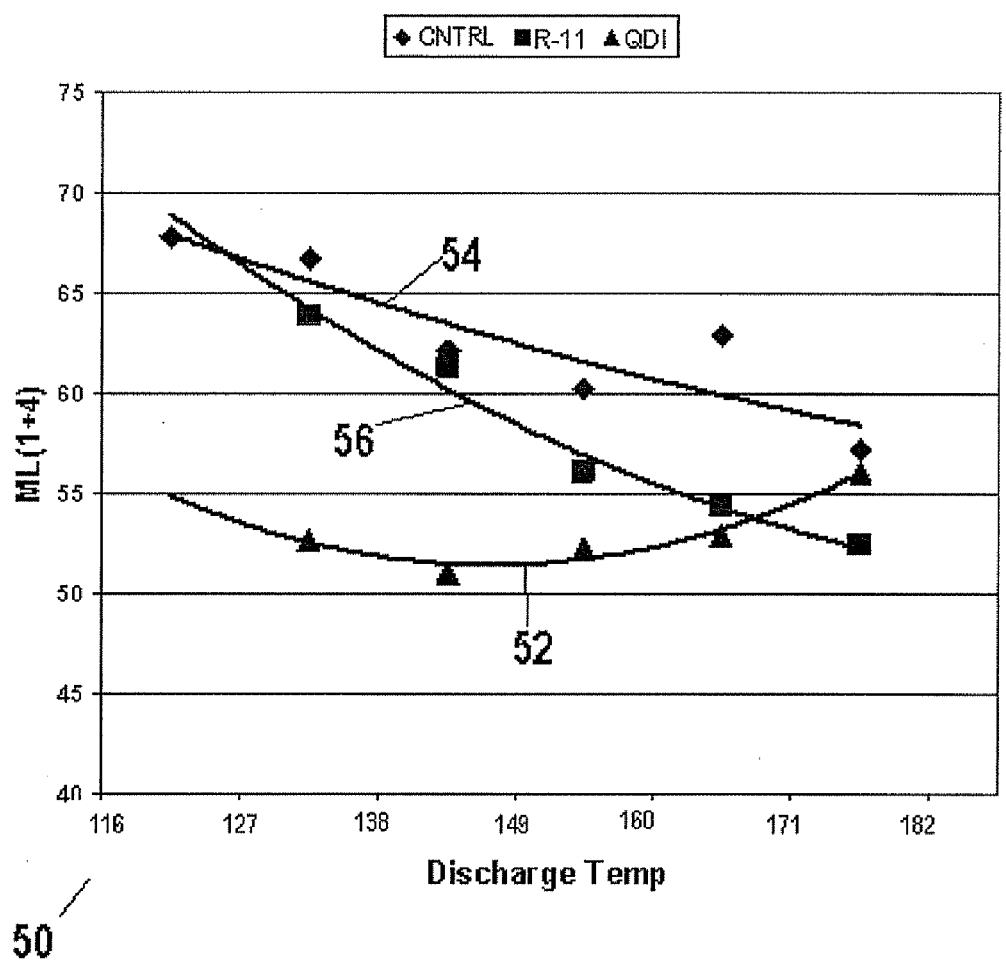
FIG. 2 is a graph showing the reduction in Mooney Viscosity as a function of the discharge temperature for a rubber blend comprising natural rubber (45%) and styrene-butadiene rubber (55%).

FIG. 2 is a graph 50 showing the reduction in Mooney Viscosity of three different master batch compositions as a function of the discharge temperature during a fourth pass mixing step, immediately prior to discharge from the mixing vessel. The Mooney Viscosity is provided in viscosity units of ML(1+4). The graph 50 includes a first graph 52 obtained from a second preferred master batch composition prepared according to Example 2. The line graphs 52, 54 and 56 were obtained from compositions according to the correspondingly numbered formulations 52, 54 and 56 in Table 1 of Example 1. The second master batch composition (graph 52) comprises a rubber elastomer blend with natural rubber (45%) and styrene-butadiene rubber (55%), 2.0 phr N-phenyl-N'-1,3-dimethylbutyl-p-quinone diimine and 50 phr carbon black. Graph 50 also includes a second graph 54 obtained from a third comparative master batch composition (control) containing the same composition as the second master batch composition without a quinone diimine antidegradant, and a third graph 56 obtained from a fourth comparative master batch that contains an R-11 peptizer instead of the quinone diimine antidegradant. The viscosity of the second master batch composition remains lower than the viscosities obtained from the first and second comparative master batch compositions throughout the range of discharge temperatures tested (from about 115-180° C.). Notably, the viscosity of the first master batch composition declines to a minimum viscosity between about 138 and 148° C., and then increases at increasing mixing temperatures up to about 180° C. In contrast, the viscosities of the third and fourth comparative master batch compositions (54, 56) continue to decrease with increasing temperature over the full range of discharge temperatures tested. Preferably, the second master batch composition is discharged at or near the minimum viscosity, such as at a temperature of about 155° C. or between 140 and 165° C.

Without being bound to theory, it is believed that the increase in the viscosity observed in the first master batch composition (graph 12) and the second master batch composition (graph 52) increase above the minimum viscosity temperature due to the decreased mobility of cross-linked rubber molecules bound to filler (carbon black) particles during the mixing process. Increasing temperatures above the minimum viscosity temperature may promote formation of crosslinks and filler-bound rubber so as to offset the reduction in viscosity due to mechanical shear degradation of natural rubber molecular chains within the master batch. It is believed that the increased effective volume of this filler-bound rubber in the presence of QDI within the master batch may increase the viscosity as the temperature increases above the minimum viscosity temperature. Preferably, the minimum viscosity temperatures occur at or below about 160-165° C. in the presence of QDI.

One embodiment provides a method of decreasing the discharge temperature of a master batch rubber blend composition comprising an isoprene elastomer and at least 5 wt % of a butadiene elastomer, the method comprising the steps of: (a) combining an isoprene elastomer and a butadiene-containing elastomer in a weight ratio effective to provide a minimum viscosity temperature of about 120° C.-160° C., a filler and an antidegradant in a mixing vessel to form a master batch rubber blend composition, the antidegredant being a quinone, a quinone imine, a quinone diimine, or a combination thereof; (b) mixing the master batch rubber blend composition for a viscosity-reducing effective period of time to reduce the viscosity of the master batch rubber blend composition to the minimum viscosity; and (c) discharging the master batch composition below about 180° C. without increasing the viscosity more than about 1, 2, 3, 4, 5, 6, 7, 8, 9, 10 or 15% above the minimum viscosity after the viscosity-reducing effective period of time. For example, referring to FIG. 1, the first master batch composition (12) may be mixed to increased temperatures above the minimum viscosity temperature to a temperature of about 180° C., thereby increasing the viscosity of the composition by about 10% relative to the minimum viscosity. Similarly, referring to FIG. 2, mixing of the second master batch composition (52) past the viscosity-reducing effective period until the temperature of the composition (52) increases to about 180° C. and the viscosity of the composition increases by about 10% over the minimum viscosity achieved between about 138° C. and 149° C.

Figure 9:
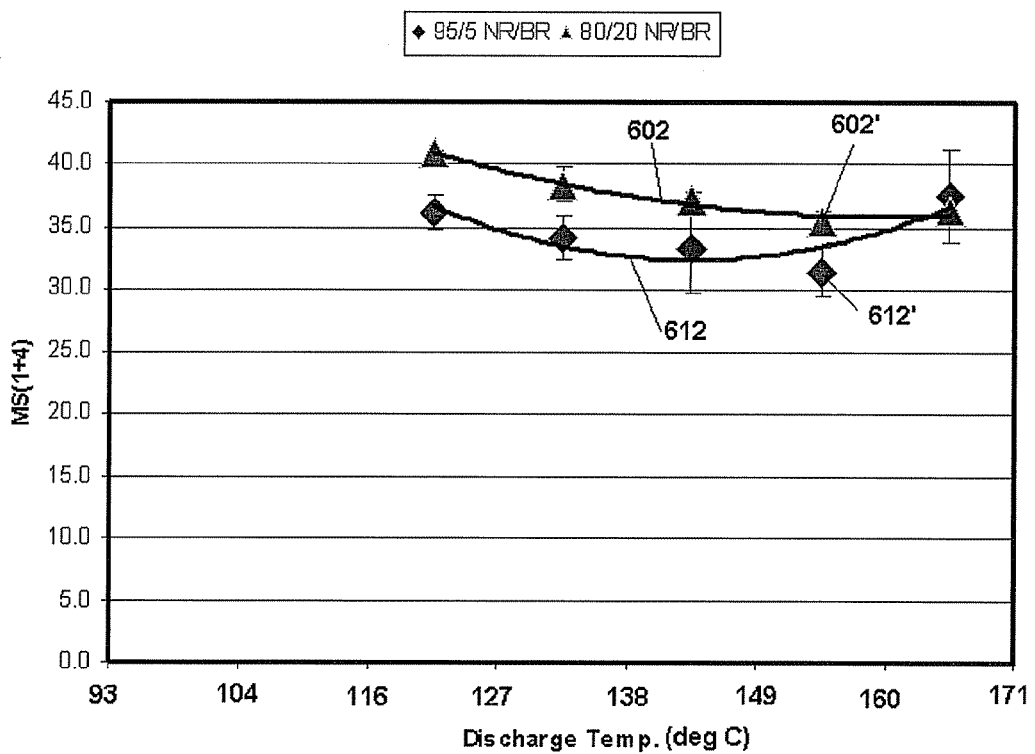
FIG. 9 is a graph showing the reduction in Mooney Viscosity as a function of the discharge temperature for a rubber blend comprising natural rubber (95%) and butadiene rubber (5%) and for a rubber blend comprising natural rubber (80%) and butadiene rubber (20%).

FIG. 9 shows the viscosity as a function of temperature for the final (fourth) pass mixing of a fifth master batch rubber blend composition (graph 602) having a composition that is comparable to the first master batch rubber blend composition (12), except that the rubber blend of the fifth master batch rubber blend composition includes 80% wt natural rubber and 20% wt butadiene rubber, instead of 45% wt natural rubber and 55% wt butadiene rubber in the first master batch rubber blend composition. A minimum viscosity 602' is labeled. FIG. 9 also shows the viscosity as a function of temperature for the final (fourth) pass mixing of a sixth master batch rubber blend composition having a blend of 95% wt natural rubber with 5% wt butadiene rubber (612). Similarly, a minimum viscosity 612' is labeled. For both the fifth (602) and sixth (612) master batch rubber blend compositions, increasing the temperature above the minimum viscosity temperature increases the viscosity of the compositions, and the minimum viscosity temperatures are less than about 160° C.

Figure 3:
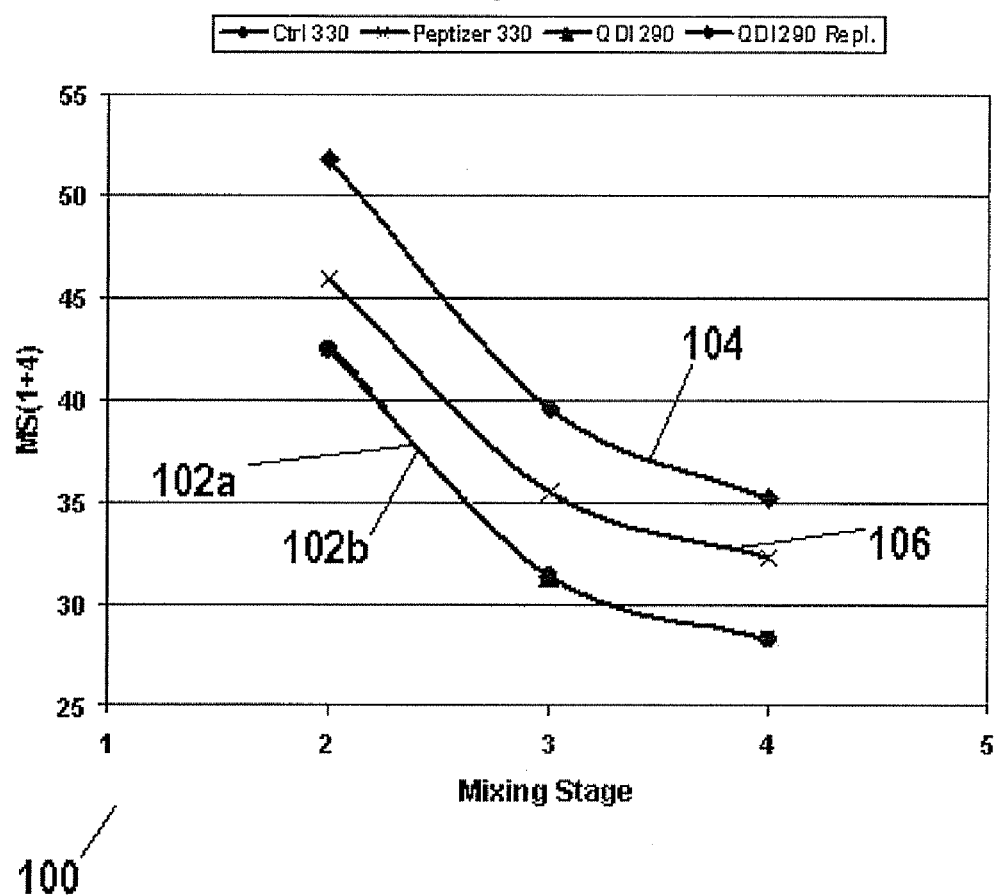
FIG. 3 is a graph showing the reduction in Mooney Viscosity per mixing stage for three rubber blend compositions comprising natural rubber and styrene-butadiene rubber.

FIG. 3 is a graph 100 showing the reduction in Mooney Viscosity per mixing stage for three rubber blend compositions comprising natural rubber (45%) and styrene-butadiene rubber (55%) during three successive mixing stages. The Mooney Viscosity is provided in small rotor viscosities of MS (1+4). The graph 100 includes a first graph 102a obtained from a third preferred master batch composition and second graph 102b obtained from a fourth preferred master batch composition discharged, both prepared according to Example 1 and discharged at about 143° C. The third and fourth master batch compositions each comprise a rubber elastomer blend with natural rubber (45%) and styrene-butadiene rubber (55%), 2.0 phr N-phenyl-N'-1,3-dimethylbutyl-p-quinone diimine and 55 phr carbon black. Graph 100 also includes a second graph 104 obtained from a fifth comparative master batch composition (control) containing the same composition as the third master batch composition without a quinone diimine antidegradant and a third graph 106 obtained from a sixth comparative master batch that contains a peptizer instead of the quinone diimine antidegradant. The fifth comparative master batch and the sixth comparative master batch were both discharged at about 165° C. The viscosity of the third master batch composition remains lower than the viscosities obtained from the fifth and sixth comparative master batch compositions throughout the three mixing stages, and was discharged at a lower temperature. Preferably, the third master batch composition is discharged at or near the minimum viscosity, such as at a temperature of about 143° C. or between about 140-150° C.

Figure 4:
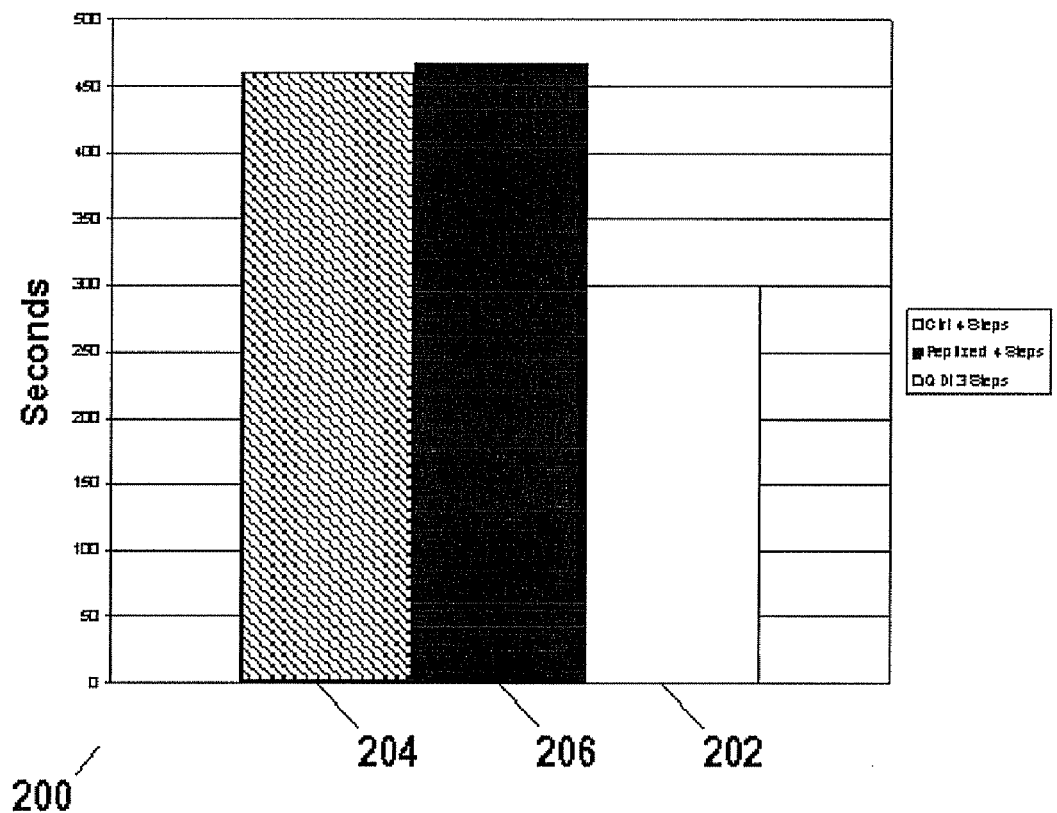
FIG. 4 is a graph showing the mixing times for three rubber blend compositions comprising a natural rubber and styrene-butadiene rubber.

FIG. 4 is a graph 200 showing the mixing times (in seconds) for three rubber blend compositions comprising a natural rubber and styrene-butadiene rubber. The mixing time 202 for the third preferred master batch composition prepared according to formulation 52 in Example 1 was about 300 seconds (data described by line 52 in FIG. 2). In contrast, the mixing time 204 for the comparative master batch comprising the rubber blend without the quinone diimine antidegradant (data described by line 54 in FIG. 2), and the mixing time 206 was obtained for the comparative master batch comprising the peptizer (data described by line 56 in FIG. 2), were both about 450 seconds or longer.

Figure 5:
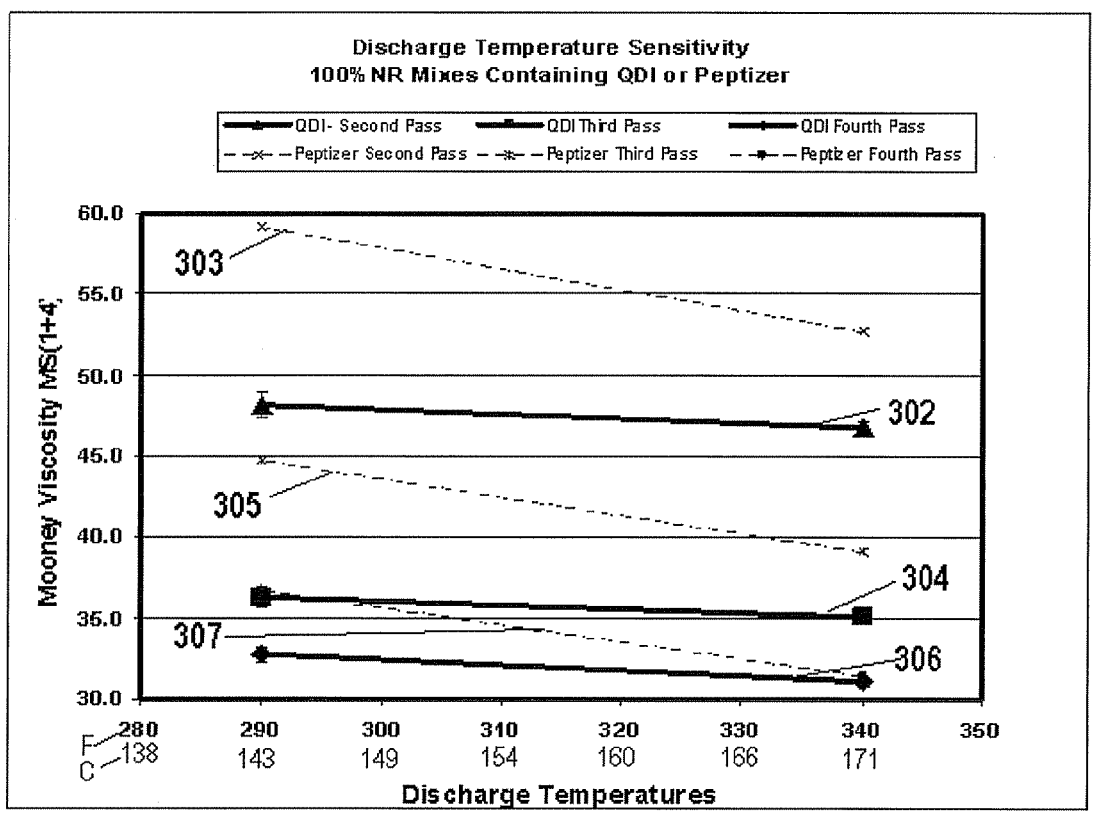
FIG. 5 is a graph showing the reduction in Mooney Viscosity per mixing stage for two comparative rubber compositions: a first composition containing natural rubber and a quinone diimine antidegradant without a butadiene-containing rubber and a second composition containing natural rubber and a peptizer, without a butadiene-containing rubber or a quinone diimine antidegradant.

FIG. 5 is a graph 300 showing the reduction in Mooney Viscosity per mixing stage a natural (isoprene) rubber compositions containing 100% natural rubber, without a synthetic butadiene-containing rubber, during three successive mixing stages. The Mooney Viscosity is provided in small rotor viscosities of MS (1+4). The data shown in the graph 300 was obtained while mixing a comparative master batch composition of Table 5, prepared according to Comparative Example 1. One of the comparative master batch compositions (mixture 1) includes a natural rubber elastomer (without any synthetic rubber or peptizer), 2.0 phr N-phenyl-N'-1,3-dimethylbutyl-p-quinone diimine and 50 phr carbon black. Graph 300 shows lines corresponding to a second mixing stage 302, a third mixing stage 304 and a fourth (final) mixing stage 306 for the first master batch mixture. The other comparative master batch composition (mixture 2 in Table 5, Comparative Example 1) was formed by mixing a natural rubber with 50 phr carbon black with a peptizer (0.2 phr Renacit 11) and other components in column 2 of Table 5. FIG. 5 shows the viscosity of each mixture as a function of temperature for three consecutive passes. For the first mixture (with QDI), the viscosities of the second (302), third (304) and fourth (306) passes decrease steadily as shown in FIG. 5. For the second mixture (with peptizer), the viscosities of the second (303), third (305) and fourth (307) passes also decrease steadily. Notably, the viscosity of the second mixture remains higher than the comparable viscosity of the first mixture until the discharge temperature of the fourth and final pass (about 340° F., or 171° C.). The comparative master batch compositions were discharged at about 171° C. Notably, the viscosity of both of the comparative master batch compositions decreased steadily from 143° C. to 171° C. during each mixing pass. For both mixtures, the viscosity continued to decrease as a function of temperature from 138° C. to 171° C., with added mixing. Unlike the mixing of elastomers including both synthetic butadiene-containing and natural isoprene elastomer components, the comparative master batch has a minimum viscosity at the maximum mixing temperature attained prior to discharge from the mixer. Therefore, mixing of the comparative master batch composition for a viscosity-reducing effective period of time to reach a minimum viscosity requires mixing the isoprene natural rubber elastomer to the highest possible temperature between the temperatures of about 120-180° C. to minimize the viscosity. In contrast, mixing of the preferred master batch compositions containing both an isoprene (natural) elastomer and a butadiene-containing (synthetic) elastomer results in a minimum viscosity occurring at about 160° C. or between 120 and 160° C. Additional mixing of the master batch above about 155-160° C. unexpectedly increased the viscosity in the master batch. The increased viscosity with additional mixing of master batch compositions with QDI to higher temperatures was not observed in comparable natural rubber master batch compositions without the butadiene-containing synthetic elastomers.

The discharge temperature of a rubber blend composition with QDI may be reduced by increasing the ratio of synthetic rubber elastomer (e.g., BR, SBR) to natural elastomer in the master batch composition. Notably, the viscosity reduction obtained from the fourth pass (307) mixing step of a natural rubber composition with QDI in FIG. 5 shows a steady reduction in the viscosity of the composition with increasing temperature, while the viscosity reduction obtained from the rubber blend (NR/BR) composition (12) with QDI in FIG. 1 and the rubber blend composition (NR/SBR) composition (52) in FIG. 2 increased with increasing temperature above the temperature of the minimum viscosity. Preferably, a rubber blend master batch composition comprises an isoprene elastomer and a butadiene elastomer in a weight ratio selected to provide a discharge temperature less than about 160° C. Also preferably, the temperature of the rubber blend composition is not heated above the temperature corresponding to the minimum viscosity.

FIGS. 1-4 and the corresponding Examples demonstrate that the preferred master batch compositions comprising the quinone diimine can have shorter mixing times at lower discharge temperatures than the comparable master batch formulations with peptizer or without the quinone diimine anti-degradant. In addition, master batch compositions containing natural rubber, QDI and carbon black, without a synthetic (butadiene-containing) rubber, showed a steady decrease in viscosity with additional mixing time to raise the master batch to higher temperatures (see FIG. 5). As described with respect to FIGS. 1-4, the mixing of master batch blend compositions containing an isoprene elastomer, a butadiene-containing elastomer, QDI and carbon black achieves a minimum viscosity after a viscosity-reducing effective period of time. Additional mixing results in an increase in the viscosity of the master batch blend composition.

The viscosity-reducing effective period of time is the time required to mix the master batch composition to a minimum viscosity of the master batch rubber blend composition, typically between the temperatures of about 120-180° C. The minimum viscosity attained by preferred master batch rubber blend compositions comprising QDI between 120-180° C. may occur during mixing at a temperature of about 160° C. or lower temperatures within the temperatures tested. Mixing the rubber blend composition comprising QDI above the viscosity-reducing effective period of time may increase the viscosity of the master batch rubber blend composition. Typically, the master batch has a viscosity of about 70 Mooney Viscosity ML(1+4) Units in a large rotor mixing vessel or 40 Mooney Viscosity MS (1+4) Units in a small rotor mixing vessel. Typically, the mixing time of the elastomer with the quinone diimine is up to about two minutes, preferably between about zero and one minute.

In a second embodiment, a mixing process includes the step of discharging the master batch at a temperature when the master batch rubber blend composition is at or near the minimum viscosity, and preferably without increasing the viscosity of the composition above the minimum viscosity. The discharge temperature at or near the minimum viscosity is preferably below about 160° C., such as a temperature of between about 120-160° C., and more preferably below about 150° C., and still more preferably below about 140° C., including discharge temperatures of about 120, 125, 130, 135, 140, 145, 150 or 155° C. corresponding to a minimum viscosity of a master batch rubber blend composition.

In a third embodiment, a mixing process is performed with a master batch rubber blend composition that is free of, or at least substantially free of, a peptizer. Examples of peptizers include sulfur compounds, mercaptans, disulfides and metal chelates. Typical peptizers may be, for example, pentachlorothiophenol and dibenzamidodiphenyl disulfide. A peptizer promotes the oxidative or random reduction of molecular weight of natural rubber elastomer polymers, thereby reducing both the molecular weight and the viscosity of the rubber. Peptizers are believed to reduce viscosity, particular at temperatures above about 150° C., by randomly promoting cleavage of molecular chains within the rubber composition. However, since peptizers randomly cleave molecular chains within the rubber, regardless of molecular weight, peptizers are less effective in altering the Z-average, viscosity average or weight average molecular weight of the rubber polymers. Many rubber molecule cleavage events resulting from the peptizer break smaller molecular weight polymer chains, thereby increasing the concentration of lower molecular weight polymer species within the rubber. Increased incidence of shorter polymer chains in the rubber may degrade the dynamic mechanical properties of the rubber network. When combined with diene elastomers, peptizers are believed to generate free radicals at higher temperatures that may combine to form higher molecular weight elastomers or cross-linked elastomers, bound rubber formation, leading to higher viscosity at higher temperatures. In rubber blends containing a natural rubber and a diene rubber, peptizers may interact differently with the natural and diene rubber components of the blend. Peptizers promote viscosity reduction of the natural rubber component at higher temperatures (e.g., above 150° C.) via random oxidative cleavage of the high molecular weight natural rubber elastomers. However, over-oxidation by the peptizer typically leads to poor carbon black dispersion or network defects, particularly if the natural rubber is heated to high temperatures. In contrast, the peptizer can increase the viscosity of the butadiene-containing elastomer portion of the blend at higher temperatures (e.g., above 150° C.) by facilitating radical formation, cross-linking and gelation, thereby increasing the average molecular weight. When combined with peptizer at higher temperatures, the butadiene-containing elastomer may behave as if the rubber compound included higher filler fractions.

Optionally, the process may further include the step of (d) combining the discharged master batch composition with at least one sulfur-containing vulcanizing agent and vulcanization accelerators and vulcanizing the resulting composition to form the vulcanized rubber composition. The discharged master batch composition may be mixed with sulfur and accelerators or other curatives and curing agents to produce a vulcanizable compound useful for forming tires or other durable rubber goods. The discharged master batch composition may be mixed with curatives and accelerators and subsequently vulcanized via conventional techniques such as by heating with a sulfur vulcanizing agent and a thiazole vulcanization accelerator.

The rubber composition may be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts. Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used.

The vulcanizable compound may then be vulcanized. Typically, the vulcanization process involves heating the master batch with a sulfur vulcanizing agent and a vulcanization accelerator, such as tert-butyl benzothiazole sulfenimide (TBBS). The vulcanization may be conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. The sulfur vulcanizing agent is typically present in an amount ranging from about 1.0 to about 6.0 phr Vulcanization accelerators are typically present in amounts ranging from about 0.4 to about 2.0 phr.

Accelerators may also be used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. Combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Upon completion of the vulcanization process, the vulcanized rubber produced therefrom has enhanced handling and processing properties compared to vulcanized rubber prepared without QDI. The enhanced handling and processing qualities imparted to the vulcanized rubber through the process of the present invention include, but are not necessarily limited to, lower viscosity (Mooney Viscosity), lower die swell (fast relaxation rate and high uncured tangent delta), lower rolling resistance (lower cured tangent delta), lower roller resistance (lower cured tangent delta), and lower filler networking (low Payne effect). The vulcanized rubber compositions may be used, for example, to form tires or treads.

Preferably, a mixing process includes two or more aspects described with respect to the first, second and third embodiments. While certain representative embodiments and details have been shown for the purpose of illustrating the invention, it will be apparent to those skilled in this art that various changes and modifications may be made therein without departing from the spirit or scope of the invention.

EXAMPLES

In the following examples, all rubber chemicals, including N-(1,3-dimethylbutyl)-N'-phenyl-p-quinone diimine (Q-Flex™ QDI™, Flexsys America L.P.) were used without further purification. Compound mixing was done in four stages. In the first stage, ingredients were added according to the recipe in Table 1. The dump temperature was 120-177° C. Compounds were characterized for processing and vulcanization properties in a Mooney viscometer (MV 2000E) and a Moving Die Rheometer (MDR 2000EA), respectively. The NR compounds were cured at 150° C. for a definite time as indicated in respective tables and samples were prepared from those vulcanizates for mechanical and dynamic mechanical properties. Stress-strain properties of the vulcanizates were measured using a Zwick universal testing machine (Model 1445) in accordance with ISO 37. Heat build-up was measured on a Goodrich Flexometer according to the method described in ASTM D623. Aging was done in accordance to ASTM D865-88. Viscoelastic properties of the vulcanizates were determined using a Metravib dynamic analyzer. These tests were carried out at 15 Hz and −20° C./+60° C. with a dynamic strain of 1%.

Example 1

Compounds were mixed in a Kobelco Stewart-Boling model BB16 internal mixer equipped with six wing rotors operated with the ram pressure set at 90 PSI and the cooling water set at 50 C. Each formulation was mixed in duplicate and the average measured values are graphted in the figures. The mixing system was characterized by the following parameters:

| Ram Pressure | 90 psi (6.21 bar) |
|---|---|
| Water Temp. | 125° F. (52° C.) |
| 4 pass: | 60 rpm MB/60 rpm remill/25 rpm cure/25 rpm remill |

In the first stage of the mixing experiment, rubber, carbon black, zinc oxide, stearic acid, and process oil as required were added to the mixer operating at 60 rpm. Other ingredients were added to the mix at various stages according to the recipes given in Table 1. Each composition was mixed until the batch temperature reached the designated discharge temperature. At that point the batch was discharged from the mixer and passed through a twin screw roller die (KSBI), sheeted into strips 12" wide and air cooled to room temperature.

TABLE 1

6 WING ROTORS

| | Sample No. | | | | | |
|---|---|---|---|---|---|---|
| | 1 | 2 | 3 | 4 | 5 | 6 |
| Mix Type | CONTROL | CONTROL | RENACIT | RENACIT | QDI | QDI |
| Rubber Blend with NR | BR | SBR | BR | SBR | BR | SBR |
| Formulation | 14 | 54 | 16 | 56 | 12 | 52 |
| 75% Fill | | | | | | |
| First Pass PHR | | | | | | |
| SAR NR | 45 | 45 | 45 | 45 | 45 | 45 |
| Diene 645 | 55 | 0 | 55 | 0 | 55 | 0 |
| Duradene 741 | 0 | 55 | 0 | 55 | 0 | 55 |
| N-234 Carbon Black | 50 | 50 | 50 | 50 | 50 | 50 |
| Zinc Oxide | 5 | 5 | 5 | 5 | 5 | 5 |
| Stearic Acid | 2 | 2 | 2 | 2 | 2 | 2 |
| Calsol 8240 Oil | 5 | 5 | 5 | 5 | 5 | 5 |
| Q-Flex QDI | 0 | 0 | 0 | 0 | 2 | 2 |
| Renacit 11 | 0 | 0 | 0.2 | 0.2 | 0 | 0 |
| Santoflex 6PPD | 2 | 2 | 0 | 0 | 2 | 2 |
| Flectol TMQ | 1 | 1 | 0 | 0 | 1 | 1 |
| TOTAL | 165.00 | 165.00 | 162.20 | 162.20 | 167.00 | 167.00 |

Discharge temperatures for First and Second Passes: 250, 270, 290, 310, 330 and 350° F. (121, 132, 143, 154, 166, 177° C.)

The second stage mix was conducted as follows; the material from the first stage mix and any required ingredients from the recipes in Table 1 were put again into the BB16 mixer operating at 60 rpm and mixed to the designated discharge temperature. Upon reaching the designated temperature, the compound was discharged and passed through the twin screw roller die, sheeted into strips 12" wide and air cooled.

TABLE 2

6 WING ROTORS

| | Sample No. | | | | | |
|---|---|---|---|---|---|---|
| | 1 | 2 | 3 | 4 | 5 | 6 |
| Mix Type | CONTROL | CONTROL | RENACIT | RENACIT | QDI | QDI |
| Rubber Blend with NR | BR | SBR | BR | SBR | B | SBR |
| Formulation | 14 | 54 | 16 | 56 | 12 | 52 |
| 75% fill | | | | | | |
| Second Pass PHR | 14 | 54 | 16 | 56 | 12 | 52 |
| MB1 | 165.00 | 165.00 | 162.20 | 162.20 | 167.00 | 167.00 |
| Santoflex 6PPD | | | 2 | 2 | | |
| Flectol TMQ | | | 1 | 1 | | |
| TOTAL | 165.00 | 165.00 | 165.20 | 165.20 | 167.00 | 167.00 |

Discharge temperatures for First and Second Passes: 250, 270, 290, 310, 330 and 350° F. (121, 132, 143, 154, 166, 177° C.)

FIG. 3 shows the stage by stage reduction in Mooney viscosity for the second third and fourth stages of the compounds mixed in Example 1 for formulations 52, 54 and 56, described below. FIG. 4 shows the cumulative total mixing time required to complete four stages of mixing for formulations 54 and 56 and the time required to complete three stages of mixing for formulation 52.

The third stage mix was conducted as follows; the material from the second stage mix was put back into the BB16 mixer along with sulfur and accelerator, the compound was mixed until the batch reached a temperature of 100° C. Upon reaching the designated temperature, the compound was discharged and passed through the twin screw roller die, sheeted into strips 12" wide and air cooled.

TABLE 3

6 WING ROTORS

| | Sample No. | | | | | |
|---|---|---|---|---|---|---|
| | 1 | 2 | 3 | 4 | 5 | 6 |
| Mix Type | CONTROL | CONTROL | RENACIT | RENACIT | QDI | QDI |
| Rubber Blend with NR | BR | SBR | BR | SBR | B | SBR |
| Formulation 75% fill | 14 | 54 | 16 | 56 | 12 | 52 |
| Third Pass PHR | 14 | 54 | 16 | 56 | 12 | 52 |
| MB2 | 165.00 | 165.00 | 165.20 | 165.20 | 167.00 | 167.00 |
| Rubbermaker's Sulfur 104 | 1.8 | 1.8 | 1.8 | 1.8 | 1.8 | 1.8 |
| Santocure TBBS | 1.2 | 1.2 | 1.2 | 1.2 | 1.2 | 1.2 |
| TOTAL | 168.00 | 168.00 | 168.20 | 168.20 | 170.00 | 170.00 |

Discharge temperatures for Third and Fourth passes: 210° F. (99° C.)

The fourth stage mix was conducted as follows: the material from the third stage was put again into the BB16 mixer operating at 25 rpm and mixed until the batch reached a temperature of 100° C. Upon reaching the designated temperature, the compound was discharged and passed through the twin screw roller die, sheeted into strips 12" wide and air cooled. The Mooney viscosity of the compound after four stages of mixing is graphted in the graphs.

TABLE 4

6 WING ROTORS

| | Sample No. | | | | | |
|---|---|---|---|---|---|---|
| | 1 | 2 | 3 | 4 | 5 | 6 |
| Mix Type | CONTROL | CONTROL | RENACIT | RENACIT | QDI | QDI |
| Rubber Blend with NR | BR | SBR | BR | SBR | B | SBR |
| Formulation 75% fill | 14 | 54 | 16 | 56 | 12 | 52 |
| Fourth Pass PHR | 14 | 54 | 16 | 56 | 12 | 52 |
| MB3 | 168.00 | 168.00 | 168.20 | 168.20 | 170.00 | 170.00 |
| TOTAL | 168.00 | 168.00 | 168.20 | 168.20 | 170.00 | 170.00 |

Discharge temperatures for Third and Fourth passes: 210° F. (99° C.)

Figure 6:
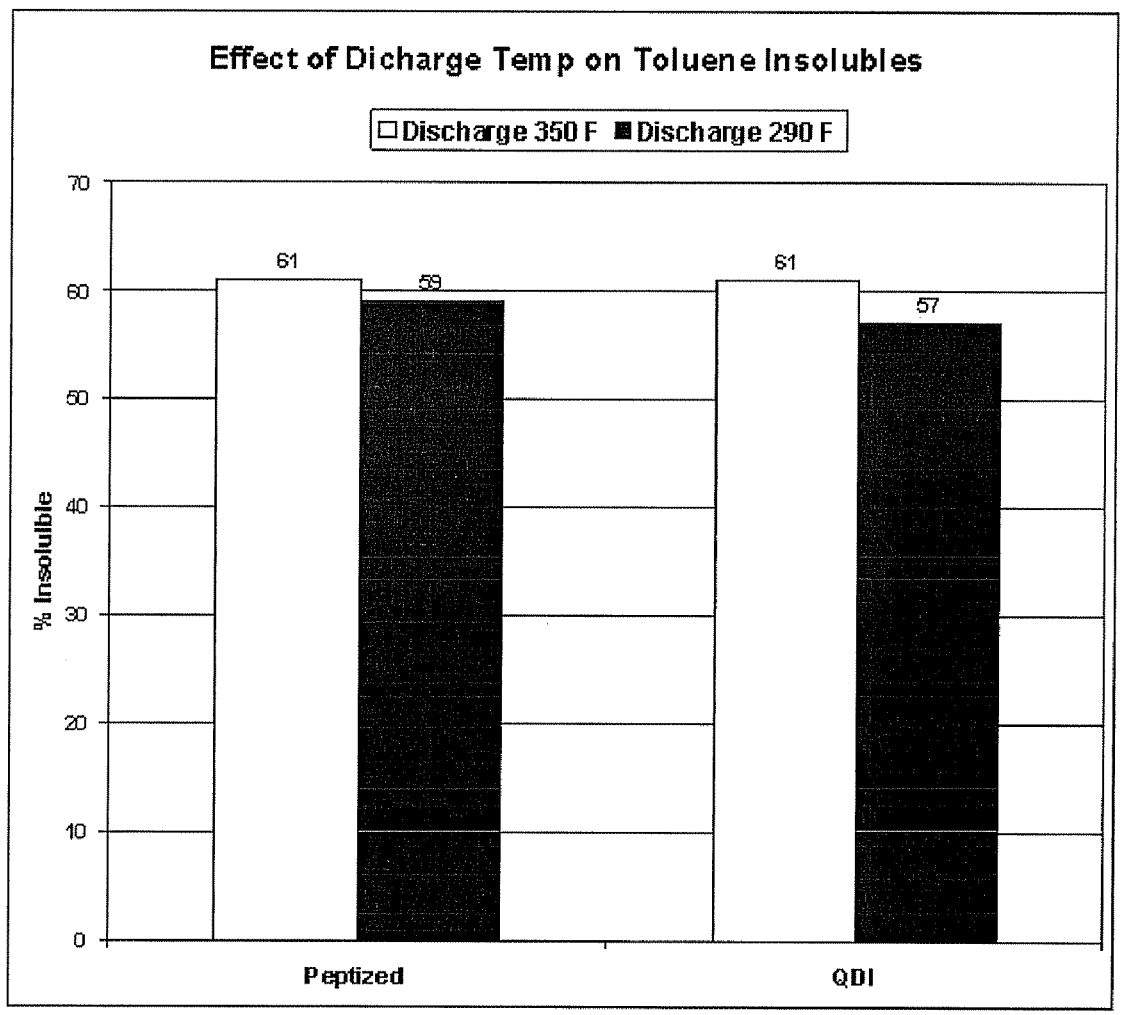
FIG. 6 is a graph showing the toluene insolubles from natural isoprene rubber compositions, without a butadiene-containing elastomer and including a peptizer or QDI.

The "gel content" or "bound rubber content" of mix formulations QDI-containing composition and the peptizer-containing composition were estimated by measuring toluene insolubles. Toluene insolubles are that fraction which is insoluble in toluene. About 1 gram of final mix compound was cut into small cubes about 1×1×1 mm. The rubber was placed in a closed vessel and tarred. 50 ml of fresh reagent grade toluene was added to the vessel and kept for 24 hours. The toluene was carefully decanted and a fresh aliquot of 50 ml was added to the vessel and kept for another 24 hours. The toluene was carefully decanted and the rubber was dried in a circulating air oven the weighed. The "toluene insolubles" value is calculated as a percentage by weight. The number then includes contribution from carbon black, zinc oxide, and any polymer of high enough molecular weight that it was not freely soluble under these conditions. The results for formulations 54 and 52 are given in FIG. 6. The percent insoluble is noted at the top of each bar.

Comparative Example 1

Samples of 100% NR compounds were mixed in accordance with the procedure described in example 1 above using the recipes in Table 5. The viscosity for rubber compound discharged at 143° C. and 171° C. are graphted in MS (1+4) Mooney Viscosity Units in FIG. 5 for the second pass (302), third pass (304) and fourth pass (306). For comparison, the experiment was repeated with a peptizer instead of QDI, with the composition detailed in the second column of Table 5. Referring to FIG. 5, the viscosity data from a second pass (303), a third pass (305) and a fourth pass (307) for a separate sample including a peptizer instead of QDI is also shown in FIG. 5. For all samples, the Renacit control had a remill after the pass. The discharge temperatures for the first pass and the second pass were 290° F. (143° C.) for the first experiment, 340° F. (171° C.) for the second experiment and 210 F for the third and fourth passes. The ram pressure was 90 psi (6.21 bar), the water temperature was 125° F. (52° C.) and the 4 pass parameters were: 60 rpm MB, 60 rpm remill, 25 rpm cure and 25 rpm remill.

TABLE 5

100% NR Recipe
6 Wing Rotors

| Mix Type | QDI | Peptizer |
|---|---|---|
| First Pass PHR 77% FILL | 1 | 2 |
| SIR 20 NR | 100 | 100 |
| N-121 Carbon Black | 50 | 50 |
| Zinc Oxide | 5 | 5 |
| Stearic Acid | 2 | 2 |
| Calsol 8240 Oil | 5 | 5 |
| Q-Flex QDI | 2 | 0 |
| Renacit 11 | 0 | 0.2 |
| Santoflex 6PPD | 2 | 0 |
| Flectol TMQ | 1 | 0 |
| TOTAL | 167.00 | 162.20 |
| 77% Fill Second Pass PHR | 1 | 2 |
| MB1 | 167.00 | 162.20 |
| Santoflex 6PPD | | 2 |
| Flectol TMQ | | 1 |
| TOTAL | 167.00 | 165.20 |
| 77% Fill Third Pass PHR (CURATIVES) | 1 | 2 |
| MB2 | 167.00 | 165.20 |
| Rubbermaker's Sulfur 104 | 1.8 | 1.8 |
| Santocure TBBS | 1.2 | 1.2 |
| TOTAL | 170.00 | 168.20 |
| 77% Fill Final Pass PHR (REMILL ONLY) | 1 | 2 |
| MB3 | 170.00 | 168.20 |
| TOTAL | 170.00 | 168.20 |

Comparative Example 2

Figure 7:
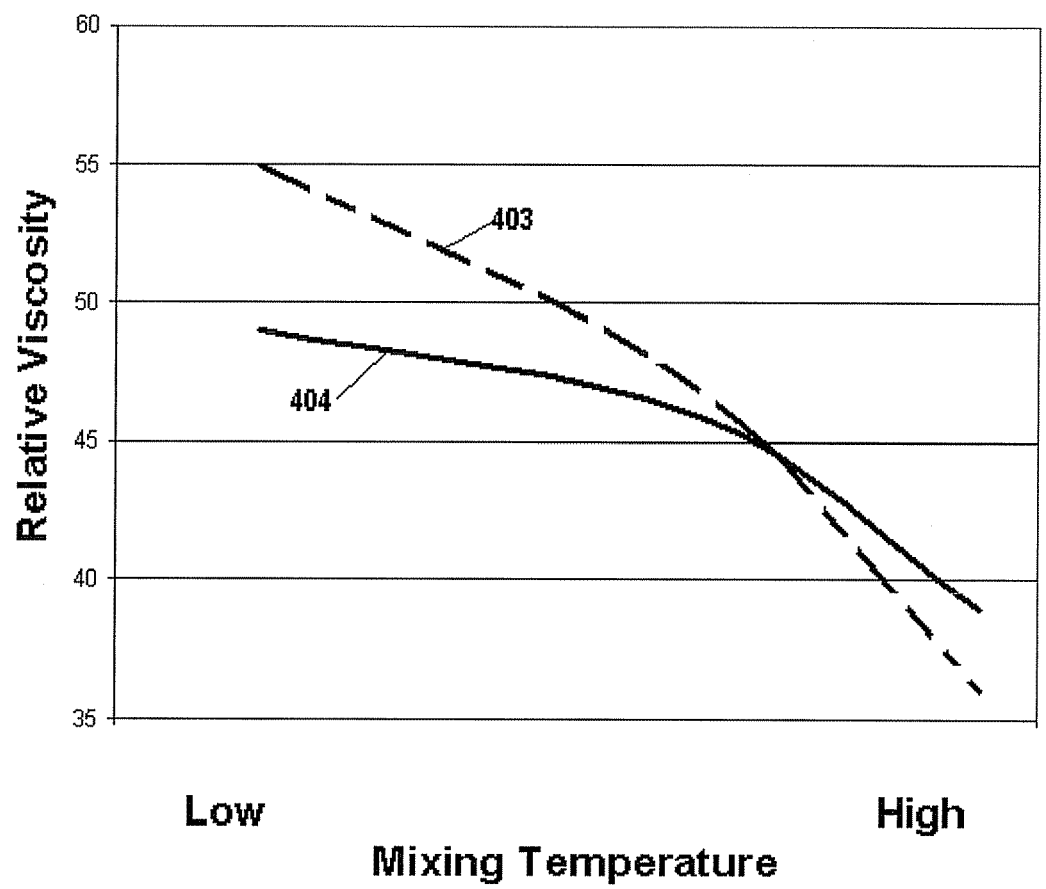
FIG. 7 is a graph showing the expected viscosity reduction behavior comparison between a natural isoprene rubber with QDI or a conventional peptizer.

Based on the mechanism of action of QDI it would be expected that the viscosity continuously decreases as a function of mix discharge temperatures. Further, it would be expected that at lower discharge temperatures, the Quinone diimine would be more efficient than a conventional peptizer at reducing viscosity. The (hypothetical) expected behavior is graphted in FIG. 7 for a natural rubber with peptizer (403) and a natural rubber with QDI (404).

Figure 8:
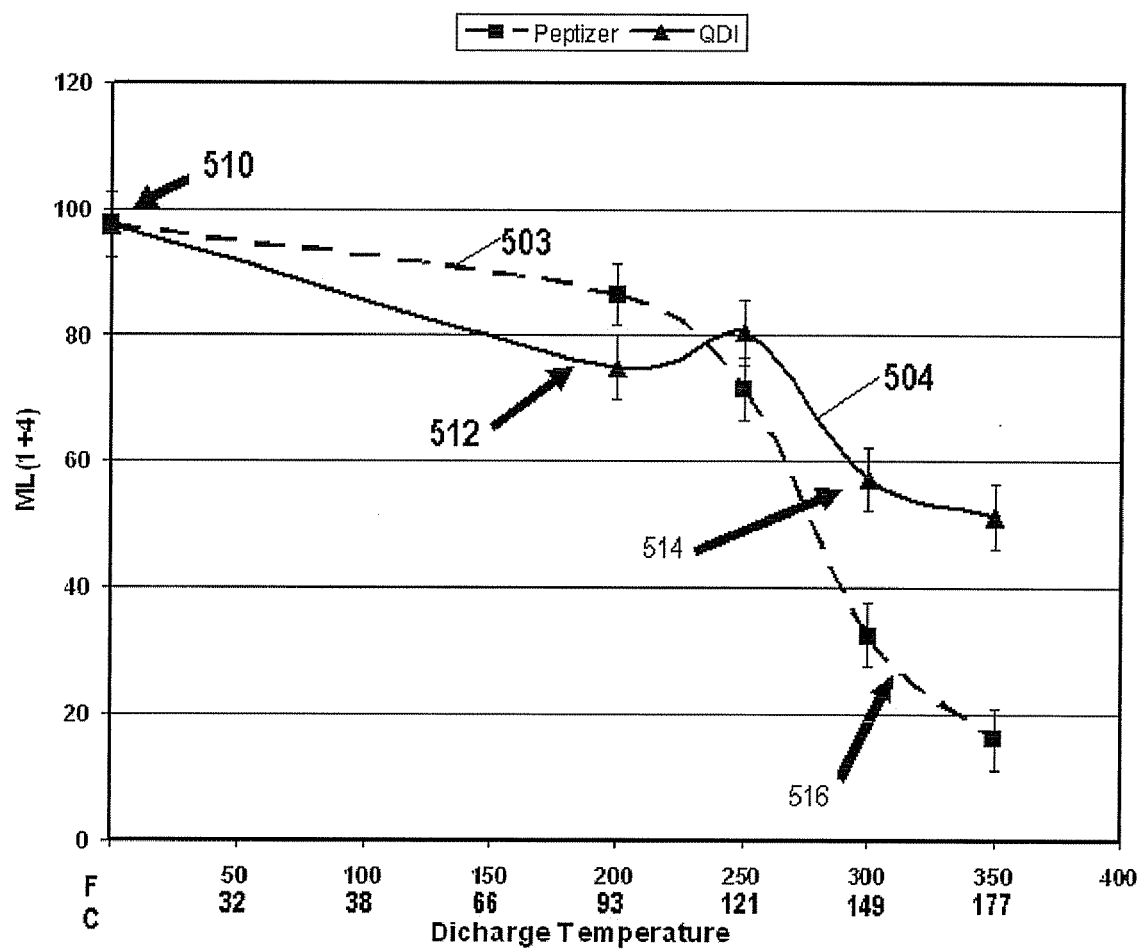
FIG. 8 is a graph showing the viscosity reduction of a natural isoprene rubber with QDI compared to the natural rubber elastomer with conventional peptizer. The compositions contained 100% NR with 2 phr of QDI and 100% NR with 0.2 phr of peptizer.

To test the expected behavior, 100% NR (Ribbed Smoke Sheet #2) was mixed in a 1 L banbury mixer and discharged at various temperatures. The results are shown in FIG. 8. Referring to FIG. 8, the viscosity as a function of temperature is shown for a first rubber composition with 0.2 phr peptizer in 100 phr natural rubber without QDI (503) and a second rubber composition with 2 phr QDI in 100 phr natural rubber without peptizer (504). At the initial low temperatures (510), the viscosity of both compositions is indicative of the raw natural rubber viscosity. With continued mixing, the viscosity of both compositions decreased with increasing temperature. At lower mixing temperatures (512), the mechanically induced degradation is believed to dominate the molecular weight reduction of the natural rubber with QDI (504), which has a lower viscosity than the natural rubber with peptizer (103) in this temperature range. As the temperature is increased, the viscosity of the peptizer-natural rubber composition (103) decreases below the viscosity of the QDI-natural rubber composition (104). The viscosity of the peptizer-natural rubber composition (103) was less than the QDI-natural rubber composition (104) by about 250 F (121° C.). At higher temperatures (514) (e.g., at or above about 300° F., 149° C.), the QDI is believed to capture oxidatively-activated mechanically cleaved claims, slowing the reduction in viscosity with increasing temperature for the QDI-natural rubber composition (104). Undesirably high levels of molecular weight breakdown and poor heat build-up characteristics may occur in the peptizer-natural rubber composition (103) at these higher temperatures (516) (e.g., at or above about 300° F., 149° C.). Notably, the viscosity of the both the QDI-natural rubber composition (104) and the peptizer-natural rubber composition (103) declined steadily with increasing temperature between about 120° C. and about 180° C.

Therefore, for both natural rubber compositions, obtaining desirably low viscosities during mixing may present a trade-off between inducing undesirable molecular processes in the mixed rubber to obtain a desirable reduction in the viscosity. In contrast, as shown in Example 1 above, rubber blend compositions may achieve minimum viscosities at lower temperatures, permitting lower dump temperatures while reducing or preventing many undesirable molecular processes in the mixed rubber master batch composition.

The invention claimed is:

1. A process for mixing a filler with a rubber blend composition containing an isoprene elastomer and a butadiene elastomer to form a mixed rubber composition, the process comprising the steps of:
   (a) combining an isoprene elastomer and a butadiene-containing elastomer, a filler and an antidegradant in a mixing vessel to form a master batch rubber blend composition, the antidegradant being a quinone, a quinone imine, a quinone diimine, or a combination thereof;
   (b) mixing the master batch rubber blend composition for a viscosity-reducing effective period of time to mix the master batch composition to a minimum viscosity of the master batch rubber blend composition;
   (c) discharging the master batch rubber blend composition from the mixing vessel at the minimum viscosity, the minimum viscosity occurring at a temperature of about 120-160° C.; and
   (d) optionally combining the mixed master batch composition discharged in step c with at least one sulfur-containing vulcanizing agent and vulcanization accelerator, and vulcanizing the resulting composition to form the vulcanized rubber composition.

2. The process of claim 1, wherein the minimum viscosity of the master batch rubber blend composition between the temperatures of about 120-180° C. occurs at a temperature of about 120-160° C.; or the master batch rubber blend composition is discharged without increasing the viscosity above the minimum viscosity after mixing the master batch rubber blend composition for the viscosity-reducing effective period of time.

3. The process of claim 1, wherein the antidegradant is a quinone diimine according to Formula (Ia) or Formula (Ib):

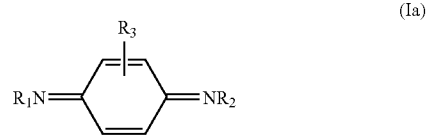

(Ia)

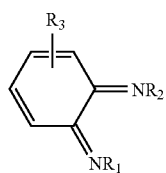

(Ib)

wherein $R_1$, $R_2$ and $R_3$ are the same or different and are independently selected from the group consisting of: hydrogen, alkyl, aryl, aralkyl, hydroxyl, halogen, alkoxy, alkaryl, cycloalkyl, heterocycle, acyl, aroyl, carbamyl alcohols, thiols, alkylthiols, and cyano.

4. The process of claim 3, where $R_3$ is hydrogen and $R_1$, $R_2$ are the same or different and are independently selected from the group consisting of alkyl and aryl.

5. The process of any one of claim 3, wherein the antidegradant compound comprises N-phenyl-N'-1,3-dimethyl-butyl-p-quinone diimine.

6. The process of claim 1, wherein the master batch rubber blend comprises about 10-90% natural rubber and the filler comprises carbon black.

7. The process of claim 1, wherein the isoprene elastomer is a natural rubber and the butadiene-containing elastomer comprises at least one compounds selected from the group consisting of: a butadiene rubber, a styrene-butadiene rubber, and a blend of butadiene rubber with styrene-butadiene rubber.

8. The process of claim 1, wherein the master batch is free of a peptizer.

9. The process of claim 1, wherein the elastomer blend is combined with the filler and the quinone diimine antidegradant prior to mixing the unvulcanized rubber composition, the filler being selected from the group consisting of: a carbon black, a silica and a mixture of carbon black and silica.

10. The process of forming a tire comprising the steps of claim 1, further comprising the step of forming a tire from the vulcanized rubber composition.

11. A method of decreasing the discharge temperature of a master batch rubber blend composition comprising an isoprene elastomer and at least 5 wt % of a butadiene elastomer, the method comprising the steps of:
(a) combining an isoprene elastomer and a butadiene-containing elastomer in a weight ratio effective to provide a minimum viscosity temperature of about 120° C.-160° C., a filler and an antidegradant in a mixing vessel to form a master batch rubber blend composition, the antidegradant being a quinone, a quinone imine, a quinone diimine, or a combination thereof;
(b) mixing the master batch rubber blend composition for a viscosity-reducing effective period of time to reduce the viscosity of the master batch rubber blend composition to the minimum viscosity; and
(c) discharging the master batch composition below about 180° C. without increasing the viscosity more than about 10% above the minimum viscosity after the viscosity-reducing effective period of time.

12. The process of claim 1, wherein the minimum viscosity for the master batch rubber blend composition is less than about 80 Mooney Viscosity ML(1+4) Units.

13. The process of claim 1, wherein the effective period of time to mix the master batch is less than 450 seconds.

* * * * *